US006324178B1

(12) United States Patent
Lo et al.

(10) Patent No.: US 6,324,178 B1
(45) Date of Patent: Nov. 27, 2001

(54) METHOD FOR EFFICIENT DATA TRANSFERS BETWEEN DOMAINS OF DIFFERING DATA FORMATS

(75) Inventors: Burton B. Lo, San Francisco; Anthony L. Pan, Freemont; Pauline Cheng, Pleasanton, all of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/085,135

(22) Filed: May 26, 1998

(51) Int. Cl.[7] .................................................. G06F 15/167
(52) U.S. Cl. ..................... 370/392; 370/466; 370/467; 370/475
(58) Field of Search ..................................... 370/392, 428, 370/466, 470, 471, 472, 473, 474, 475, 476, 467; 710/52, 56, 22, 26, 27; 709/213, 214, 217

(56) References Cited

U.S. PATENT DOCUMENTS

| | | | |
|---|---|---|---|
| 5,796,742 | * | 8/1998 | Klotzbach et al. ................... 370/466 |
| 5,815,679 | * | 9/1998 | Hoffman et al. .......................... 710/8 |
| 5,898,687 | * | 4/1999 | Harriman et al. .................... 370/392 |
| 5,949,785 | * | 9/1999 | Beasley ................................. 370/398 |
| 6,111,880 | * | 8/2000 | Rusu et al. ............................ 370/466 |
| 6,219,697 | * | 4/2001 | Lawande et al. ..................... 709/221 |

OTHER PUBLICATIONS

Johansson, IP over IEEE 1394, IETF, Internet–Draft, pp. 1–17, Aug. 1997.*

Hoe et al, StarT–Jr: A Parallel System from Commodity Technology, MIT, pp. 1–17, Oct. 1, 1996.*

* cited by examiner

Primary Examiner—Wellington Chin
Assistant Examiner—Frank Duong
(74) Attorney, Agent, or Firm—Wagner, Murabito & Hao

(57) ABSTRACT

A method for efficient data transfers between domains of differing data formats. In one exemplary implementation, data transfer is performed with respect to an IEEE 1394 communication domain and an Ethernet communication domain. The novel data transfer method advantageously eliminates the need to copy the data payload section of a received data packet from one memory region to another memory region within a bridge device coupled between first and second communication domains. Specifically, the header, data payload and trailer sections of a received data packet (of a first communication domain format) are copied into a first portion of memory within the bridge device. The present invention then assembles a new data packet by constructing a new header of a second communication domain and appending a pointer to the new header that points to the data payload location within the first portion of memory. The header includes a destination address obtained from the data payload location and a source address of the bridge device. The new packet is of the second communication domain. The bridge device then transmits the new header section to the second communication domain and forwards the data payload therewith using the pointer as a reference. Domain interface controller circuits then add the new trailer, as required, to the new packet. By passing a pointer to the data payload, the present invention eliminates the need to copy the data payload from one region of memory to another during the transfer operation.

20 Claims, 13 Drawing Sheets

| PACKET COMPONENT | NAME(S) | SIZE (BITS) | SUBCLAUSE | COMMENT |
|---|---|---|---|---|
| DESTINATION IDENTIFIER | DESTINATION_ID | 16 | 6.2.4.2.1 | ALL ASYNCHRONOUS PACKETS |
| TRANSACTION LABEL | TL | 6 | 6.2.4.3 | ALL ASYNCHRONOUS PACKETS |
| RETRY CODE | RT | 2 | 6.2.4.4 | ALL ASYNCHRONOUS PACKETS |
| TRANSACTION CODE | TCODE | 4 | 6.2.4.5 | ALL PRIMARY PACKETS |
| PRIORITY | PRI | 4 | 6.2.4.6 | ALL ASYNCHRONOUS PACKETS |
| SOURCE IDENTIFIER | SOURCE_ID | 16 | 6.2.4.7 | ALL ASYNCHRONOUS PACKETS |
| PACKET-TYPE-SPECIFIC INFORMATION | DESTINATION_OFFSET | 48 | 6.2.4.2.2 | REQUEST PACKET: DESTINATION OFFSET |
| | RCODE & RESERVED | 4 & 44 | 6.2.4.2.10 | RESPONSE PACKET: RESPONSE CODE AND RESERVED FIELD |
| PACKET-TYPE-SPECIFIC QUADLET DATA | QUADLET_DATA | 32 | 6.2.4.2.11 | QUADLET PACKETS: QUADLET PAYLOAD |
| | DATA_LENGTH AND EXTENDED_TCODE | | 6.2.4.8, 6.2.4.9 | DATA-BLOCK PACKETS: DATA LENGTH AND EXTENDED TRANSACTION CODE |

METHOD FOR EFFICIENT DATA TRANSFERS BETWEEN DOMAINS OF DIFFERING DATA FORMATS

BACKGROUND OF THE INVENTION

1. FIELD OF THE INVENTION

The present invention relates to the field of communication systems. The present invention relates to communication systems having differing communication domains. In one embodiment, the present invention relates to communication systems including local area networks (LANs) using the Ethernet communication protocol (e.g., the IEEE 802.3 Standard) and systems using the IEEE 1394 serial communication bus standard.

2. RELATED ART

Networked communication systems ("networks") are very popular mechanisms for allowing multiple computers and peripheral systems to communicate with each other within larger computer systems. Local area networks (LANs) are one type of networked communication system and one type of LAN utilizes the Ethernet communication standard (IEEE 802.3). One Ethernet LAN standard is the 10 BaseT system which communicates at a rate of 10 Megabits per second and another Ethernet LAN standard, 100 BaseT, communicates at a rate of 100 Megabits per second. Computer systems can also communicate with coupled peripherals using different bus standards including the Peripheral Component Interconnect (PCI) bus standard and the Industry Standard Architecture (ISA) and Extended Industry Standard Architecture (EISA) bus standards. Recently, the IEEE 1394 serial communication standard has become a popular bus standard adopted by manufacturers of computer systems and peripheral components for its high speed and interconnection flexibilities. Each of the above communication standards communicates data packets using its own data packet format. Unfortunately, data packet formats are not necessarily compatible from one communication standard to another.

Due to the many communication standards available within computer systems and communication systems, it is often the case that one computer (or device) of one communication standard or "domain" needs to communicate with another computer (or device) of another communication domain. Since the data packet formats (e.g., data frame formats) between differing communication standards are not necessarily compatible, bridge circuits have been used in the prior art to allow communication from one communication domain to another. The bridge circuit is physically coupled between the two communication domains and is thereby made available to receive and send data packets for each communication domain.

FIG. 1A illustrates one exemplary bridge circuit 10 of the prior art that is used to provide communication between communication domain "A" 20*a* and communication domain "B" 20*b* that have incompatible data packet formats. An exemplary data flow direction is shown for data packets ("packets") originating from communication domain "A" 20*a* and destined for communication domain "B" 20*b*. The bridge circuit 10 contains a first memory unit 12 for receiving the header, data payload and trailer portions of a data packet from domain A 20*a*. A second memory unit 16 is also included. Once a data packet from domain A 20*a* is received, the data processor circuit 14 reads each byte of the stored data packet and transforms the data packet into the format compatible for domain B 20*b*. As the data processor circuit 14 transforms the data packet to the format for domain B 20*b*, the data packet is read, byte-by-byte, from memory 12 and copied into the second memory 16. For instance, the header is read from memory 12, processed, and stored in memory 16. Likewise, the data payload section is read from memory 12, transformed and stored in memory 16 along with the trailer. Once the new data packet is assembled in memory 16 and compatible with domain B 20*b*, it is transmitted to controller circuits which forward the packet to domain B 20*b*.

While this prior art bridge circuit 10 of FIG. 1A provides a mechanism for transferring data from one communication domain to another, it is inefficient because much of the information of the original data packet is copied into memory twice (e.g., "recopied" once received). For instance, the data is copied into memory 12 when received and then copied, again, into memory 16 when assembling the new packet format. These two copy processes increase the time required for the bridge circuit 10 to provide communication between domain A 20*a* and domain B 20*b* because the received data packet is copied twice. Also, these two copy processes increase the memory resource requirements of the bridge circuit 10 because different memory spaces are required for storing the original packet and its reassembled and translated version.

While bridge circuit 10 of FIG. 1A illustrates only the circuitry required to provide communication in one direction, e.g., from domain A 20*a* to domain B 20*b*, FIG. 1B illustrates the components required for a bridge circuit 10' that allows simultaneous bidirectional communication flow. To allow the forward flow of information, bridge circuit 10' requires two memories, a first memory 12*a* to receive a packet from domain A 20*a* and a second memory 16*a* to receive its translated version destined for domain B 20*b*. To allow the simultaneous reverse flow of information, bridge circuit 10' requires two more memories, a third memory 16*b* to receive a packet from domain B 20*b* and a fourth memory 12*b* to receive its translated version destined for domain A 20*a*. Therefore, the two copy processes described above also increase the memory requirements for bridge circuit 10' to allow simultaneous bi-directional communication.

Accordingly, the present invention provides an efficient data transfer method between communication domains of differing data packet formats. The method of the present invention eliminates one of the above two copy processes when performing a data transfer between communication domains of differing data packet formats. Therefore, the bridge circuit of the present invention has reduced memory resource requirements and also operates faster compared to the prior art bridge circuits. These and other advantages of the present invention not specifically mentioned above will become clear within discussions of the present invention presented herein.

SUMMARY OF THE INVENTION

A method is described herein for efficient data transfers between domains of differing data formats. In one exemplary implementation, the data transfer is performed with respect to an IEEE 1394 communication domain and an Ethernet communication domain. During the process for assembling the new data packet, the data transfer method of the present invention advantageously eliminates the need to copy the data payload section of a received data packet from one memory region to another memory region within a bridge device coupled between first and second communication domains. Because the bridge circuit of the present invention eliminates one of the copy processes required of the prior art, the present invention has reduced memory resource requirements and also operates faster compared to the prior art bridge circuits.

Specifically, the header, data payload and trailer sections of a received data packet (of a first communication domain format) are copied into a first portion of memory within the bridge device. Under software control, the present invention then causes the bridge device to construct a new header, of a second communication domain, and appends a pointer to the new header that points to the data payload location within the first portion of memory. The new header includes a destination address obtained from the data payload location a source address of the bridge device and can include the length of the data payload section. A new packet of the second communication domain is then assembled from the newly constructed header and the pointer. The bridge device then transmits the new header section to the second communication domain and forwards the data payload therewith using the pointer as a reference. Domain interface controller circuits then add the new trailer, as required, to the newly assembled data packet. By passing a pointer to the data payload when assembling the new data packet, the present invention eliminates the need to copy the data payload from one region of memory to another thereby saving processing time and memory resources.

Specifically, in a bridge circuit, embodiments of the present invention include a method for transferring information comprising the computer implemented steps of: a) storing a first data packet, received from a communication bus of a first communication domain, into a first memory space of a memory unit, wherein the data packet is of a first packet format and comprises: a header section; a data payload section; and a trailer section; b) recording a pointer indicating the start and length of the data payload section in the first memory space; c) generating a new header section of a second packet format, different from the first packet format, and corresponding to a second communication domain; d) appending the pointer to the new header section; and e) transmitting the new header section over the second communication domain and, using the pointer as a reference, transmitting the data payload section directly from the first memory space and over the second communication domain.

Embodiments include the above and wherein the step c) comprises the steps of: accessing the data payload section to obtain a destination address of a node within the second communication domain and storing the destination address as a part of the new header section; and storing an address of the bridge circuit as a source address of the new header section and further wherein the step e) comprises the steps of: e1) transmitting the new header section and the data payload section, as a new data packet, to an interface controller circuit of the second communication domain, the new data packet for a destination node indicated by the destination address; e2) computing a cyclic redundancy check (CRC) of the new header section and the data payload section; and e3) transmitting a trailer section including the CRC over the second communication domain for the destination node, the steps e2) and e3) performed by the interface controller circuit.

BRIEF DESCRIPTION OF THE DRAWINGS

FIG. 8C illustrates a field description table pertinent to the exemplary IEEE 1394 data packets of FIGS. 8A and 8B.

DETAILED DESCRIPTION OF THE INVENTION

In the following detailed description of the present invention, a method for efficient data transfers between domains of differing data formats, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Figure 1:
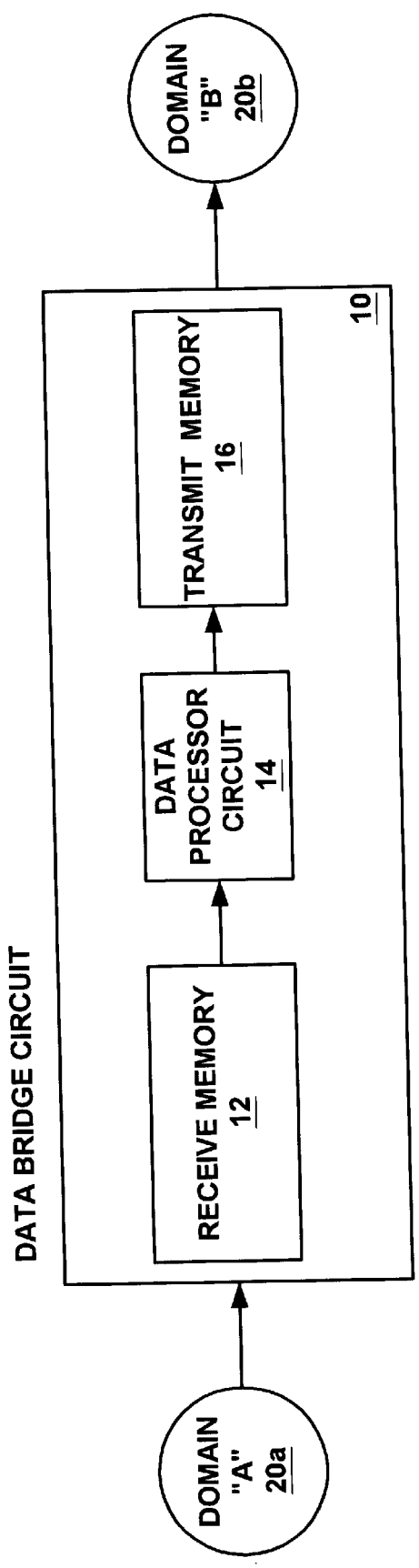
FIG. 1A illustrates a bridge circuit implemented in accordance with the present invention for transferring data packets.
FIG. 1B illustrates a prior art bridge circuit supporting simultaneous bi-directional data packet flow between communications domains of differing packet formats.
Figure 1B:
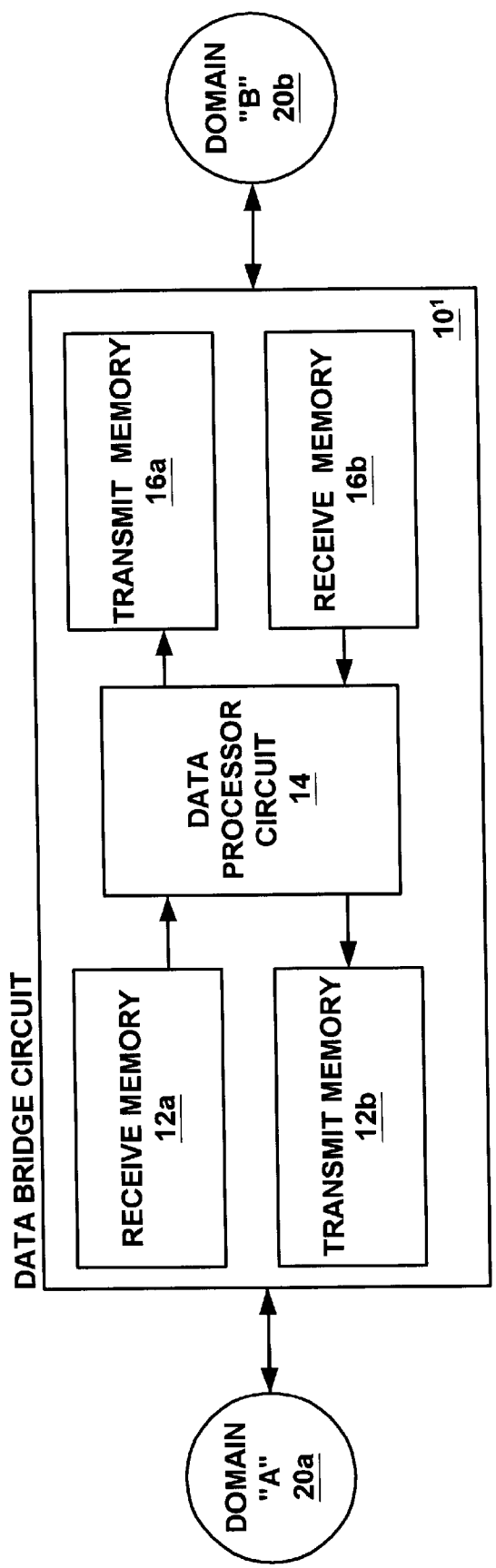
Figure 2A:
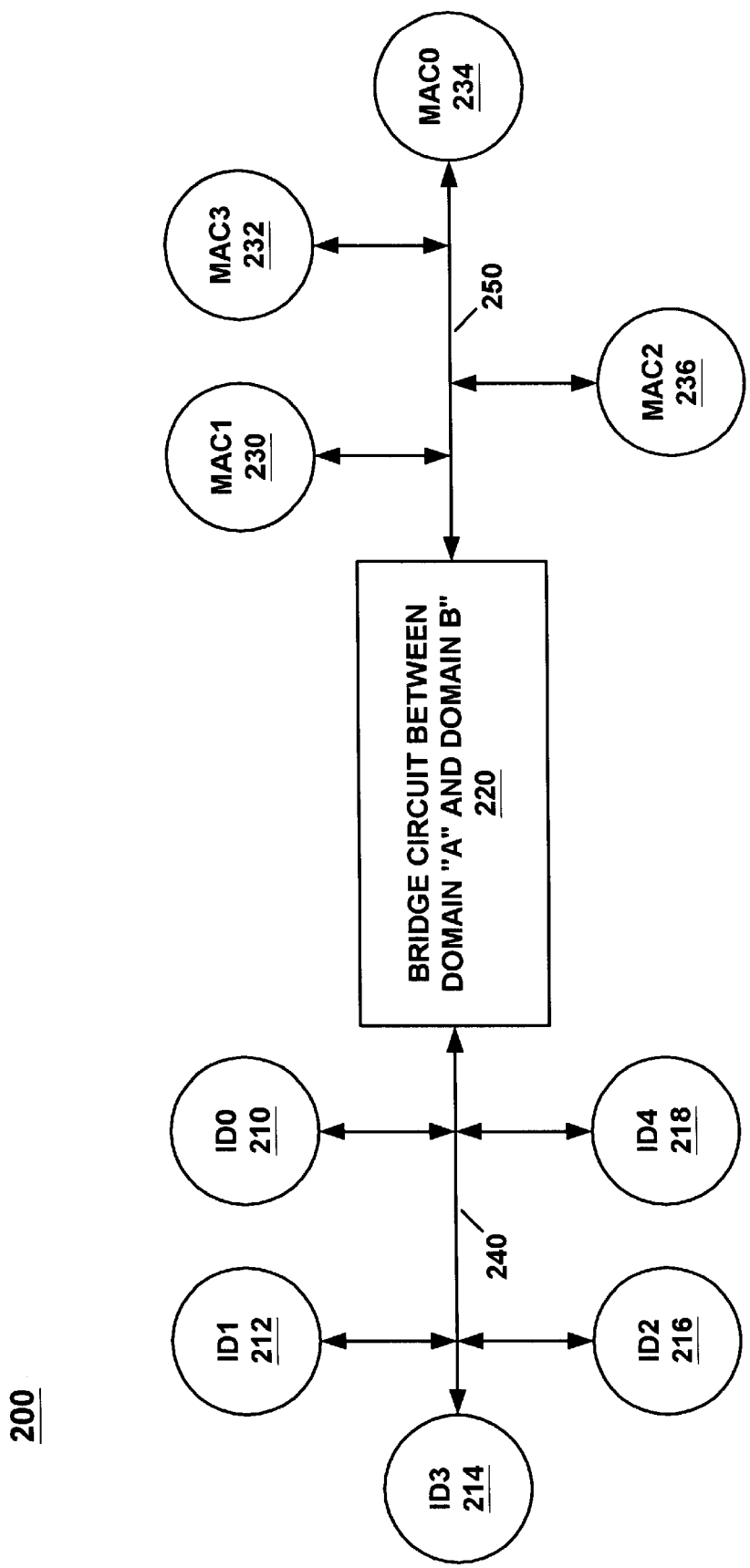
FIG. 2A illustrates a communication system allowing data transfers between domains of differing data formats and including a bridge circuit of the present invention.

Communication System 200. FIG. 2A illustrates a communication system 200 in accordance with the present invention. The communication system 200 includes a first communication domain including one or more nodes 210–218 which are coupled to a first communication bus 240. In one embodiment, the first communication domain is compatible with the IEEE 1394 serial communication standard, but could be any communication standard in accordance with the present invention. The nodes 210–218 of the first communication domain can individually be a peripheral system, device or a computer system. The first communication bus 240 is coupled to a bridge circuit 220 of the present invention. When using an IEEE 1394 serial communication standard, upon a bus reset each of the nodes 210–218 are assigned a node identification number using well known techniques, hence ID0–ID4 are assigned in this example. For each IEEE 1394 bus 240, up to 63 different nodes can be recognized in one implementation.

The communication system 200 of FIG. 2A also includes a second communication domain including one or more nodes 230–236 coupled to a second communication bus 250.

In an exemplary embodiment, the second communication domain is compatible with the Ethernet IEEE 802.3 ("Ethernet") communication standard, but could be any communication standard in accordance with the present invention. Like the first communication domain, the nodes of the second communication domain can individually be a peripheral system, device or a computer system. The second communication bus 250 is coupled to a bridge circuit 220 of the present invention. When using an IEEE 802.3 Ethernet standard, each of the nodes 230–236 are assigned an identification number or Media Access Control ("MAC") address, hence MAC0–MAC3 are assigned in this example. An "IP" address can also be used for node identification in lieu of the MAC address.

Generally, each node of the first and second communication domains is capable of originating data packets onto its respective communication domain and also capable of receiving data packets from its respective communication domain. A data packet originating from a node has the node's identification as a source address (within the header section of the data packet) and a data packet destined for a node has the node's identification as a destination or target address in the header section.

The second communication domain is generally different from the first communication domain and therefore the bridge circuit 220 is required to provide communication between the first and second communication domains. As shown in FIG. 2A, bridge circuit 220 of the present invention provides simultaneous bi-directional data flow between the nodes of the first and second communication domains. Data communication is typically provided via defined data packets. Data packets of the first communication domain are compatible with a first packet format and data packets of the second communication domain are compatible with a second data packet format.

Figure 2B:
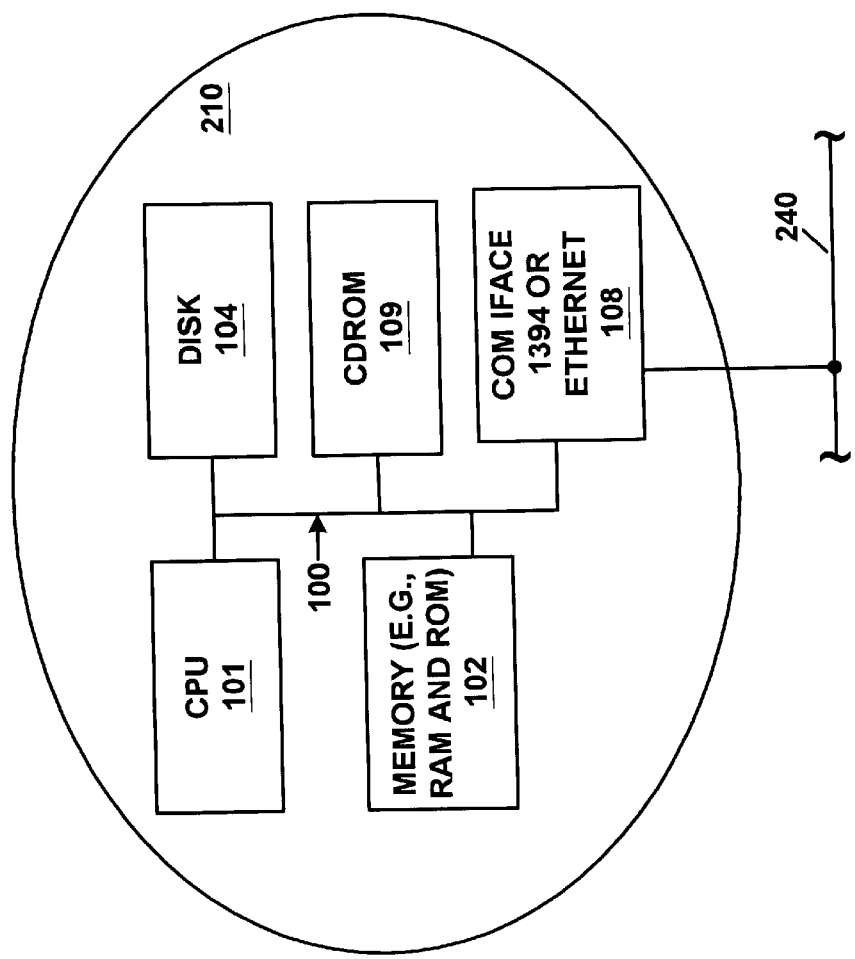
FIG. 2B illustrates an exemplary computer system node of the communication system shown in FIG. 2A.

FIG. 2B illustrates the circuitry of an exemplary node 210 of the first communication domain, but could also relate to an exemplary node of the second communication domain of communication system 200. In this example, node 210 is a host computer system but could also be a peripheral computer system or a peripheral device. The node 210 contains a processor (e.g., a microcontroller or microprocessor) 101 coupled to an internal bus 100 (e.g., 1394, EISA, PCI, etc.). Also coupled to bus 100 is a mass storage unit 104 which could be an optical or magnetic disk. A compact disk read only memory (CDROM) unit 109 can also be optionally coupled to bus 100 and a computer readable memory unit 102 can be coupled to bus 100. Memory 102 can include read only memory (ROM) portions and/or random access memory (RAM) portions. In the embodiment where the first communication domain is compatible with the IEEE 1394 serial communication standard, a communication interface unit 108 is provided and coupled to bus 240. If this node were part of the second communication domain, then, in one embodiment, an Ethernet communication interface would be used instead and this interface would be coupled to bus 250. The exemplary node 210, like other nodes, is capable of originating data packets onto the first communication domain and capable of receiving data packets from the first communication domain according to information stored in the header section of the data packet.

Figure 3A:
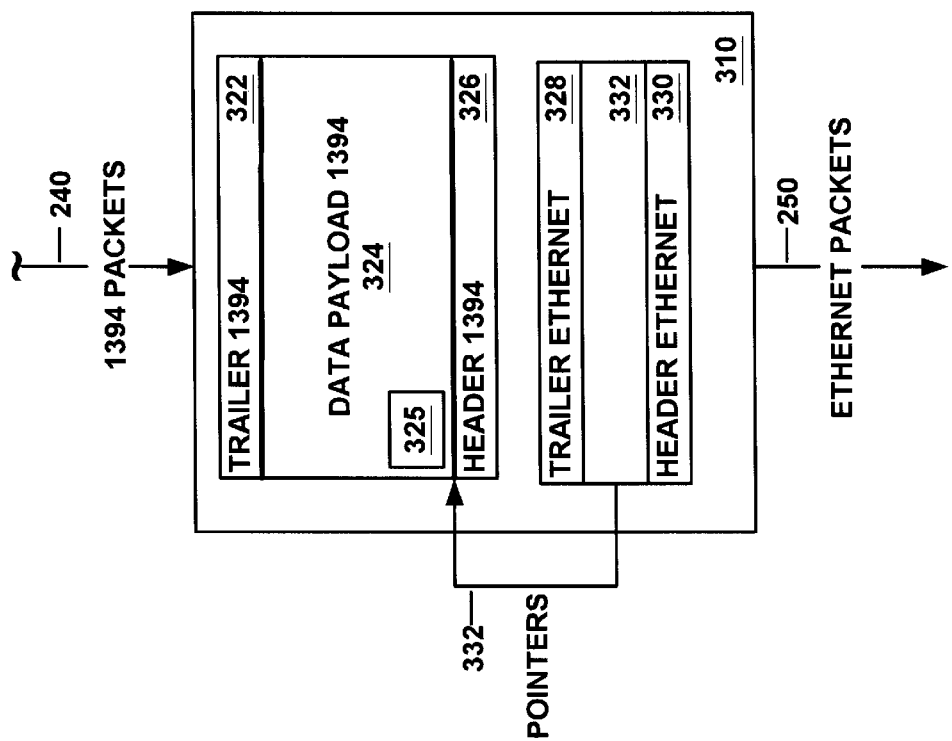
FIG. 3A illustrates a data flow diagram in accordance with one embodiment of the present invention for transferring data packets from a first communication domain to a second communication domain.

Data Flow of Bridge 220. FIG. 3A illustrates the data flow performed within the bridge circuit 220 of the present invention when transferring a data packet from the first communication domain to the second communication domain. In an example only, a transfer is discussed with respect to an IEEE 1394 serial communication domain to an Ethernet communication domain. Generally, the present invention provides a method and circuit for optimizing data transfers between a node having a particular data frame format ("data packet format") to another node having a different data frame format. In this end, the bridge circuit 220 can be used to provide communication between different types of networks, different types of buses or different types of protocols. Typically, a data frame format consists of a header section, a data payload. section and a trailer section designating the end of a frame (e.g., data packet). When the data payload travels through different domains, the bridge circuit 220 efficiently disassembles and reassembles the frame to encapsulate the data payload with a header and a trailer that correspond to the format of the particular domain to which the frame is destined.

With respect to the example of FIG. 3A, a data packet or "frame" is received by bridge circuit 220 from the first communication bus 240. The data packet is stored into a first memory space 310 of bridge circuit 220. As stored, the data packet contains a header section 326, a data payload section 324 and a trailer section 322. In this example, the received data packet is compatible with the IEEE 1394 communication standard and the memory space 310 adopts a first-in-first-out (FIFO) configuration.

The present invention eliminates the need to copy the data payload section 324 from one memory space to another memory space during the assembly of a new data packet compatible with the second communication bus 250 (e.g., Ethernet). Instead, only a small amount of memory is required to store pointers 332 to the data payload section 324. Specifically, the bridge circuit 220 assembles a new data packet by including a new header section 330, a pointer 332, a length of the data payload 324 and an optional trailer section 328. Bridge circuit 220 generates the new header section 330 to be compatible with the second communication domain and stores this new header section 330 in memory space 310. The bridge circuit 220 then appends a pointer 332 to the header new section 330 that points to the start of the data payload section 324. The length of the data payload section 324 is also appended to the pointer 332. Optionally, a trailer section 328 can be stored in memory space 310 also at this time.

The information of the received data packet is then forwarded as a newly assembled data packet, compatible with the second communication standard, by sending the start of the new header section 330. The pointer 332 is used as a reference to forward the data payload section 324 to the second communication bus 250. The length of the data payload section 324 can be used to indicate its transmission termination point. Importantly, in accordance with the present invention, the data payload section 324 is not recopied into any other memory space in the assembly process of the new packet or in its transmission to the new communication domain, as required of the prior art. Therefore, the memory requirements of the first memory space 310 are significantly reduced and the packet assembly process of the present invention operates faster than the prior art methods. Essentially, the newly assembled data packet consists of the new header section 330, a pointer 332 to the data payload 324 and optionally a new trailer 328. The new trailer section 328 is optional at this point because many of the interface controller circuits (e.g., the physical and link layers of the communication standards) automatically generate trailers on-the-fly based on the header and data payload sections.

Figure 3B:
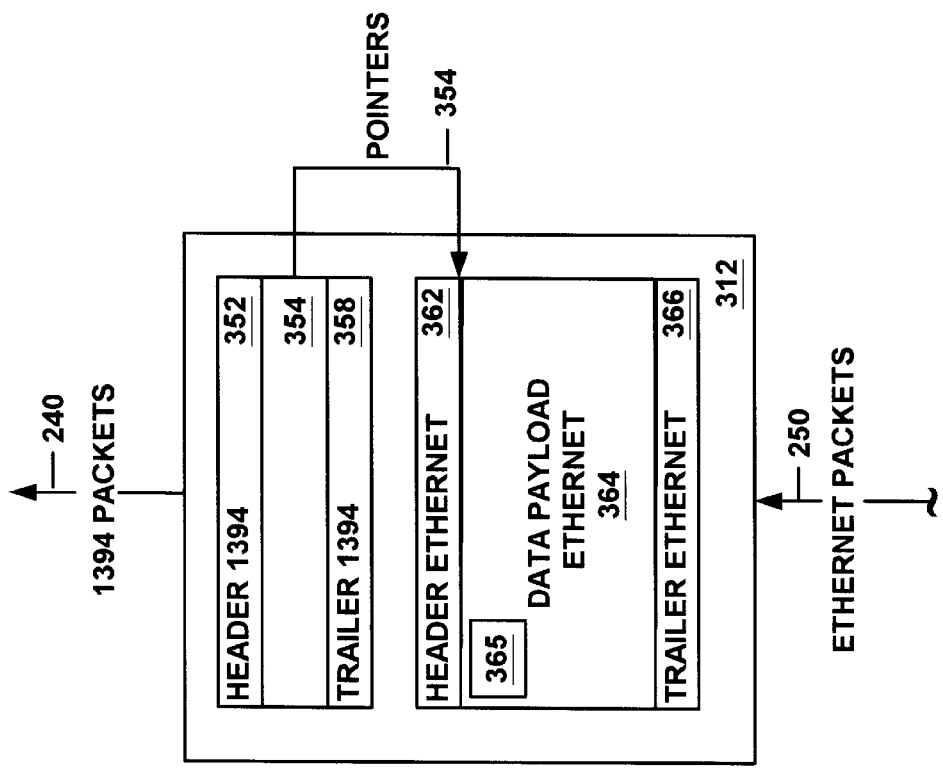
FIG. 3B illustrates a data flow diagram in accordance with one embodiment of the present invention for transferring data packets from the second communication domain to the first communication domain.

FIG. 3B illustrates the data flow of the bridge circuit 220 of the present invention in the reverse direction (e.g., for a data packet originating from the second communication bus 250 to the first communication bus 240). The overall data flow is analogous to FIG. 3A except a new data packet is received from second communication bus 250 and stored in a second memory space 312. It is appreciated that a second FIFO memory space 312 is needed only to support simultaneous bi-directional communication between the first and second communication domains. If simultaneous bi-directional communication is not allowed by bridge circuit 220, then the reverse data flow of FIG. 3B can use the same memory space 310 as FIG. 3A. With respect to the reverse data flow, the received data packet (e.g., an Ethernet data packet) contains a header section 362, a data payload section 364 and a trailer section 366.

The bridge circuit 220 converts the received data packet into a new header 352, a pointer 354 to the start of the payload section 364 and a length of the payload section 364. A new trailer section 358 is optionally created. This newly assembled packet is then forwarded to the first communication domain over the first communication bus 240 using the pointer 354 as a reference without the need to recopy the data payload section 364 to another memory space. By avoiding any need to recopy the data payload section 364, the present invention advantageously requires less memory resources of memory space 312 and also performs faster data communication between the first and second communication domains.

Figure 4:
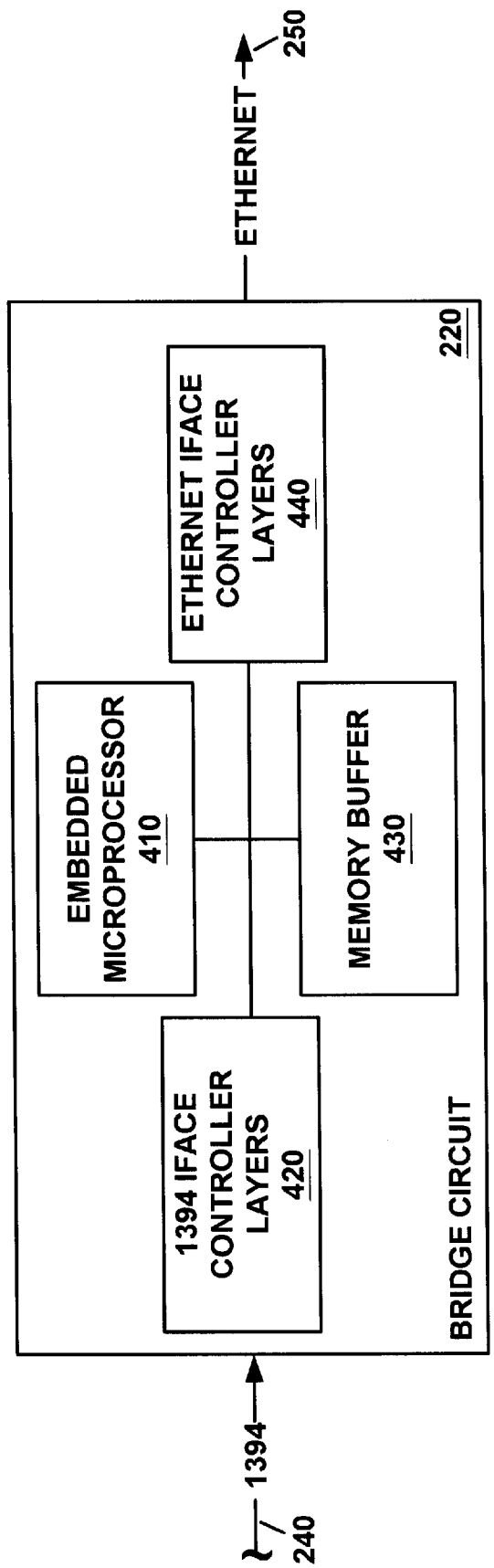
FIG. 4 is a logical block diagram of a bridge circuit in accordance with the present invention.

Bridge 220 Hardware. FIG. 4 illustrates a block diagram of the hardware components of the bridge circuit 220 of the present invention. Bridge circuit 220 contains a processor unit (e.g., a microprocessor) 410. In one embodiment, the processor unit 410 is an embedded processor or "microcontroller" that can be an ARM (Advanced Risc Machine) processor. The processor 410 is capable of accessing and executing instructions stored in memory unit 430. The processor 410 is coupled to a bus 400 which is also coupled to a memory unit 430 that contains volatile (e.g., RAM) and non-volatile (e.g., ROM) portions.

The bridge circuit 220 also contains two interface controller circuits 420 and 440. Interface controller circuit 420 is coupled to the first communication domain and interface controller circuit 440 is coupled to the second communication domain. In one embodiment, circuit 420 is a well known IEEE 1394 interface controller circuit that contains well known physical and link layer circuits for providing communication to and from the IEEE 1394 serial communication bus 240 once presented with an assembled data packet. In one embodiment, circuit 440 is a well known Ethernet interface controller circuit that contains well known physical and link layer circuits for providing communication to and from the Ethernet communication bus 250 once presented with an assembled data packet.

The memory buffer 430 of FIG. 4 is coupled to bus 400 and provides addressable memory cells for the first memory space 310 and the second memory space 312 of FIG. 3A and FIG. 3B, respectively. Memory buffer 430 also contains instructions for implementing data transfer processes 500 and 700 of FIG. 5 and FIG. 7, respectively, which are discussed below.

Figure 5:
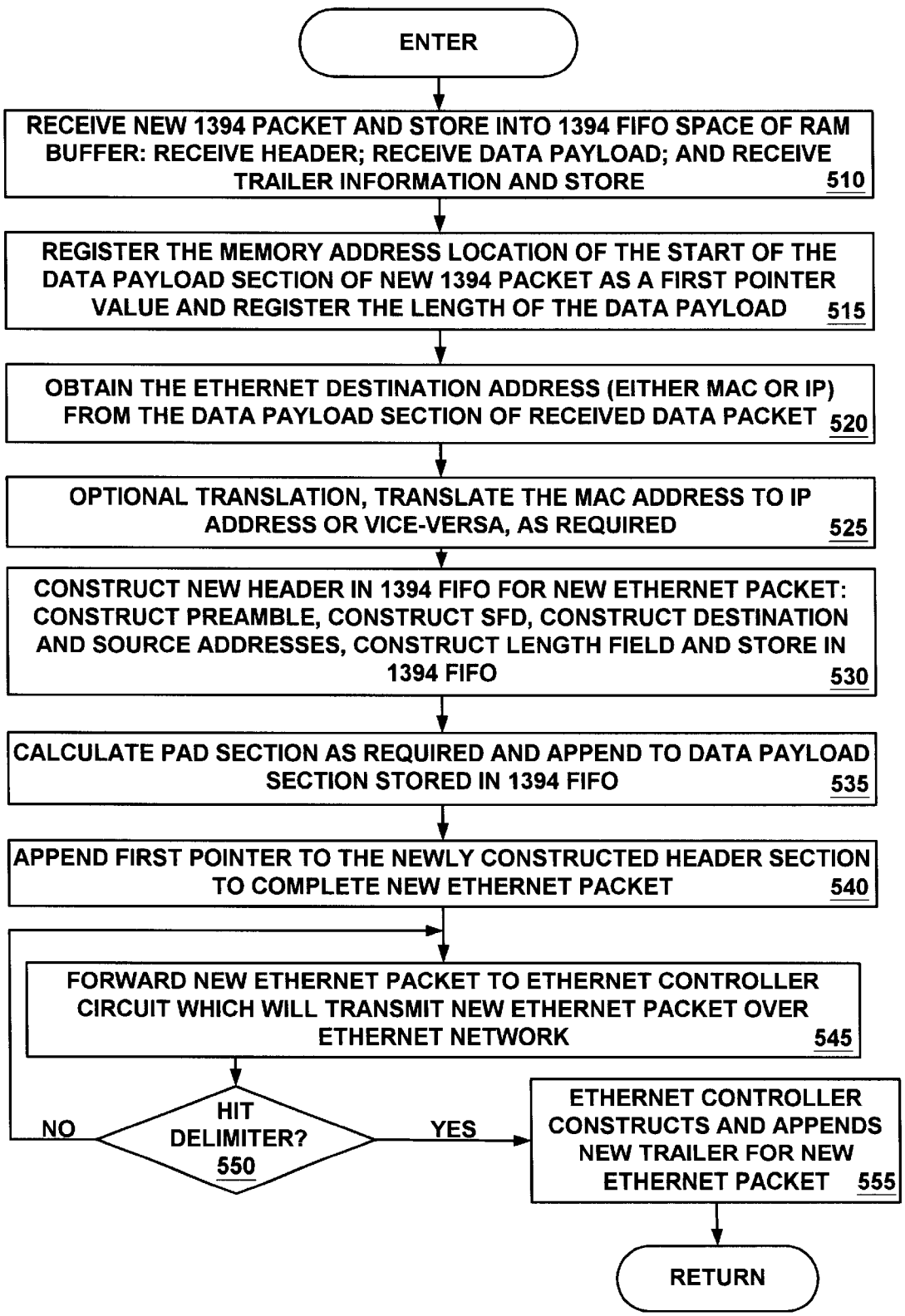
FIG. 5 is a flow diagram illustrating steps performed by the bridge circuit of the present invention for transferring data packets from the first exemplary communication domain to the second exemplary communication domain
Figure 7:
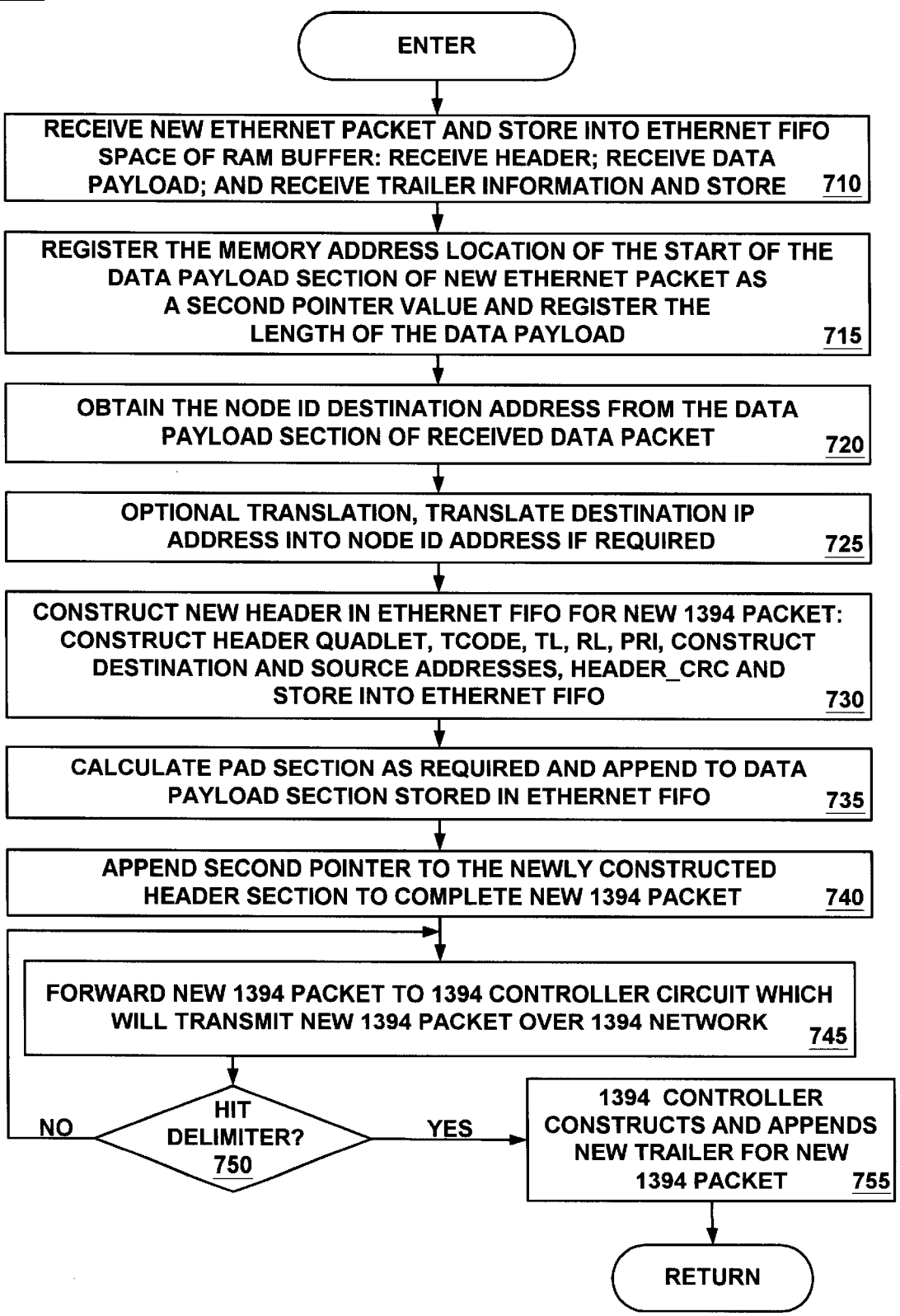
FIG. 7 is a flow diagram illustrating steps performed by the bridge circuit of the present invention for transferring data packets from the second exemplary communication domain to the first exemplary communication domain

Bridge 220 Software. FIG. 5 and FIG. 7 illustrate, respectively, the steps performed by the bridge circuit 220 for transferring data from the first communication domain to the second communication domain and vice-versa. These data transfer processes are now discussed. Aspects of the bridge software are also described in co-pending U.S. patent application, Ser. No. 09/085,395, filed concurrently herewith and entitled "Method for Managing Network Data Transfers with Minimal Host Processor Involvement," by Lo, Pan and Cheng, and assigned to the assignee of the present invention, attorney docket number 3COM-1551IPG, which is incorporated herein by reference.

FIG. 5 illustrates a process 500 for transferring a data packet from the first communication domain to the second communication domain. The data is received by bridge circuit 220 and originates from the first communication bus 240. Process 500 is implemented by bridge circuit 220 as instructions stored in memory buffer 430. Process 500 commences at step 510 where a new IEEE 1394 data packet is received over bus 240 and stored the first or "1394" memory space 310. The header section 326, the data payload section 324 and the trailer section 322 of the IEEE 1394 data packet are stored in memory space 310. The header section 326 contains a source address indicating the node of nodes 210–218 of the first communication domain that originated the data packet. The header section 326 also contains a destination address indicating the identification of the bridge circuit 220 within the format of the first communication bus 240. In the embodiment where the 1394 serial communication bus is used, the source address and the destination address of the header section 326 are node identification (ID) numbers. Bridge circuit 220 uses the destination node ID in header 326 to receive the data packet. At step 515, bridge circuit 220 then registers the memory address location of the start of the data payload section 324 as a first pointer value 332. Also at step 515, the present invention determines the length (e.g., in bytes or words) of the data payload section 324 and registers this length value in memory space 310.

At step 520, the present invention reads section 325 (FIG. 3A) of the data payload section 324 stored in memory 430 to obtain another destination address (either in MAC or IP format) for the data packet. This destination address in section 324 identifies a node of the nodes 230–236 of the second communication domain which is the ultimate receiver of the data packet. At step 525, an optional translation is performed with respect to the destination address obtained from step 520. If a MAC to IP or vice-versa translation is required, then step 525 performs the translation based on look-up tables (LUTs) stored and maintained by the bridge circuit 220 within memory unit 430.

Figure 6:
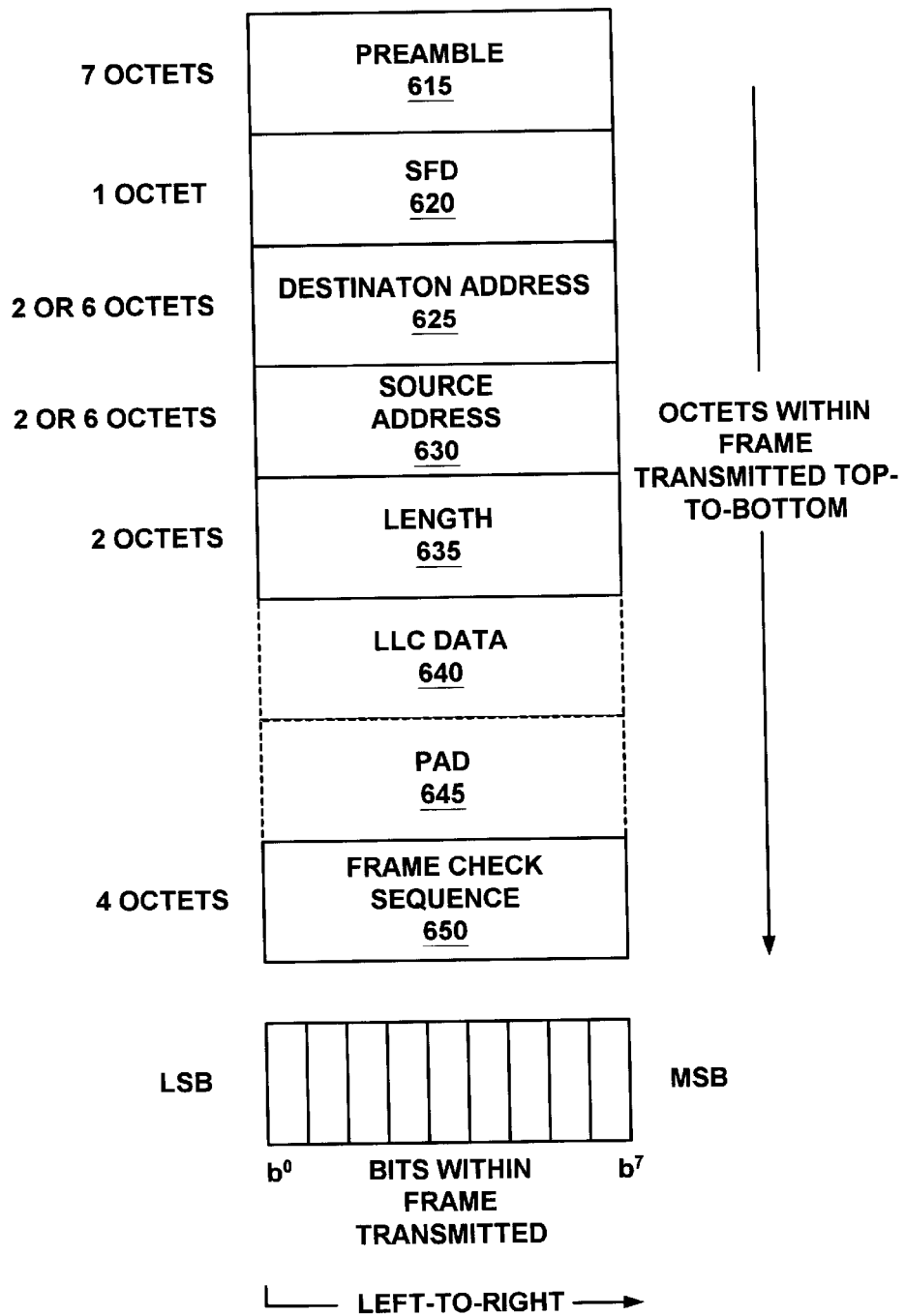
FIG. 6 illustrates fields within an exemplary Ethernet data packet.

At step 530 of FIG. 5, the present invention constructs a new header section 330 within the data packet format of the second communication domain, e.g., the Ethernet domain. FIG. 6 illustrates an exemplary MAC frame format 610 used by the Ethernet domain. The new header section 330 comprises a preamble 615, an SFD field 620, a destination address 625, a source address 630 and a length field 635. At step 530, the present invention generates the preamble 615 which is a well known field and within the IEEE 802.3 standard is a 7-octet field used by all the PLS circuitry to reach its steady state synchronization with the receive frame timing. At step 530, the present invention also constructs the Start Frame Delimiter (SFD) field 620 which is a one octet predetermined bit pattern indicating the start of frame. The destination address used for field 625 is the destination address obtained by step 520 from the data payload section 324 and optionally translated by step 525. The source address 630 refers to the address of the bridge circuit 220 as defined by the second communication domain. In this embodiment, the source address 630 is the Ethernet (e.g., MAC or IP) address of the bridge circuit 220. The length field 635 is constructed at step 530 by inserting the length of the data payload section 324 as determined at step 515. The LLC Data field 640 represents the data payload section 324.

At step 535 of FIG. 5, the present invention then calculates any pad section 645 (FIG. 5) that may be required within the data payload section 324. The padding section 645 (FIG. 6) indicates extra bits added so that the overall frame 610 meets certain minimum (e.g., 64 bytes) and maximum (e.g., 1500 bytes) sizing requirements and byte alignments which are well known within the IEEE 803.2 standard. This computed pad section 645 is then appended to the data payload section 324 at step 535.

At step 540 of FIG. 5, the present invention assembles a new data packet for the second communication domain including the new header 330, as described above, and the appended pointer 332 which references the data payload 324. The original header section 326 and trailer section 322 of the received 1394 data packets are stripped away and discarded. At step 545, the present invention forwards the new header 330 to the interface control circuitry 440 for transmission to the second communication bus 250. The first pointer 332 is then passed to the interface control circuitry 440 which automatically accesses the data within the data payload section 324 and broadcasts this data over the second communication bus 250 until termination, e.g., an end delimiter is discovered (at step 550) or the payload data 324 is fully transmitted as discovered by its previously determined length. Step 545 is re-entered until termination is reached and each byte of data payload section 324 is directly accessed from memory 310 and broadcast over bus 250. Upon termination, step 555 is entered which broadcasts any padding and trailer as required. Process 500 then terminates.

Using well known methods, the interface control circuitry 440 generates a new trailer for the Ethernet data packet automatically (at step 555) and performs the required cyclic redundancy checks (CRC) and inserts this data as the trailer or Frame Check Sequence section 650 (FIG. 6). Step 555 can also include the steps of recylcing and reusing said header section in a multi-packet session. It is appreciated that process 500 of the present invention is advantageous over the prior art because the data payload section 324 is not recopied from one memory space to another at any step during the assembly of the new Ethernet packet or during its transmission over the second communication domain.

FIG. 7 illustrates a process 700 in accordance with the present invention for transferring a data packet from the second communication domain to the first communication domain. The data is received by bridge circuit 220 and originates from second communication bus 250. Process 700 commences at step 710 where a new Ethernet data packet is received over bus 250 and stored in second or "Ethernet" memory space 312. The header section 362, the data payload section 364 and the trailer section 366 of the Ethernet data packet are stored in memory space 312. The header section 362 contains a source address indicating the node of nodes 230–236 of the second communication domain that originated the Ethernet data packet. The header section 362 also contains a destination address indicating the identification of the bridge circuit 220 within the format of the second communication bus 250. In the embodiment where the Ethernet communication standard is used as the second communication domain, the source address and the destination address of the header section 362 are either MAC addresses or IP addresses. At step 715, bridge circuit 220 then registers the memory address location of the start of the data payload section 264 as a second pointer value 354. Also at step 715, the present invention determines the length (e.g., in bytes or words) of the data payload section 364 and registers this length value.

At step 720, the present invention reads section 365 (FIG. 3B) of the data payload section 364 stored in memory 430 to obtain a destination node identification (as a destination node ID) for the data packet. The destination node_ID of the data payload section 364 identifies a node of the nodes 210–218 of the first communication domain that is the ultimate receiver of the data packet. At step 725 an optional translation is performed with respect to the destination address obtained from step 720. If a MAC or IP address to node ID address translation is required, then step 725 performs the translation based on look-up tables (LUTs) stored and maintained by the bridge circuit 220 within memory unit 430.

Figure 8A:
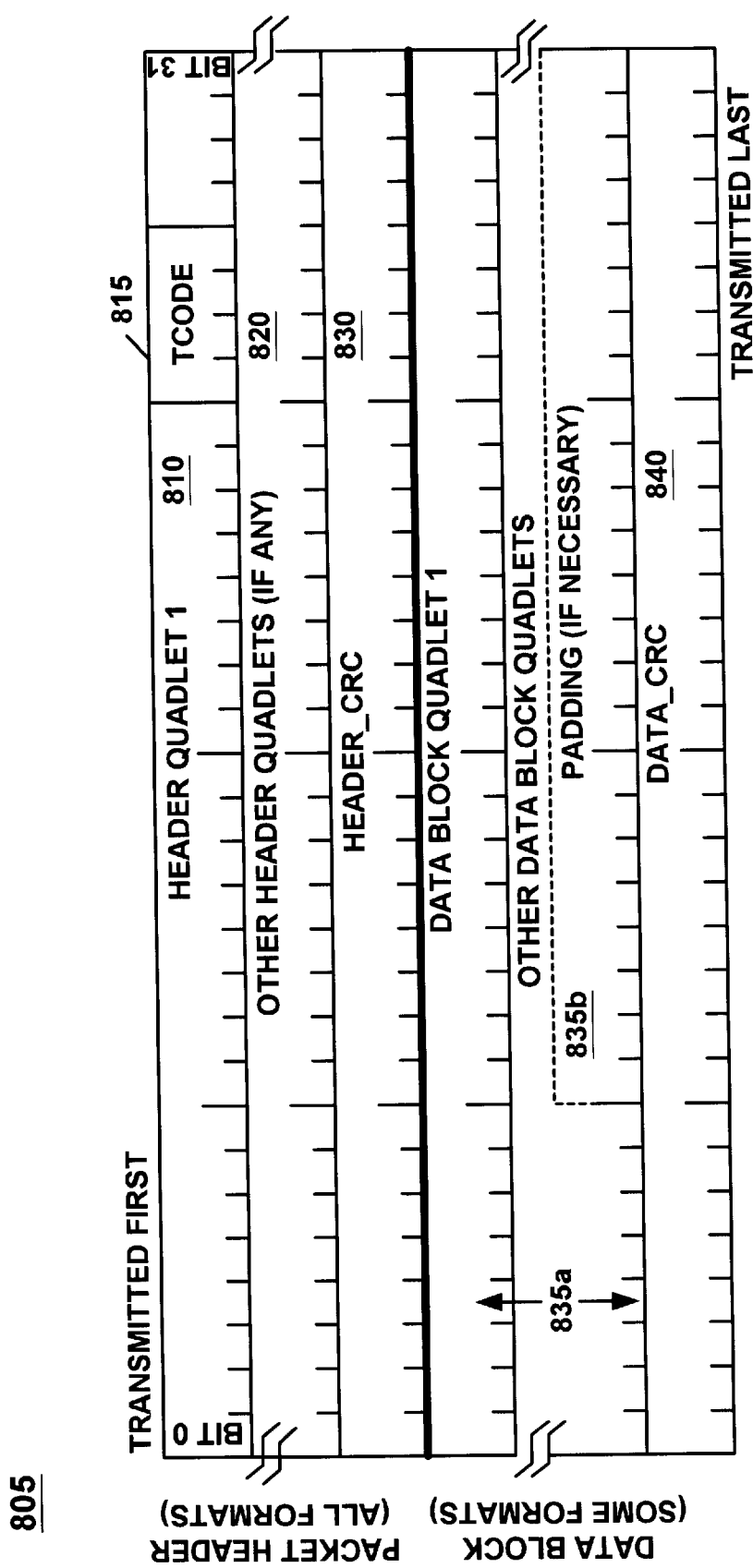
FIGS. 8A and 8B illustrate fields respectively within exemplary generic and asynchronous IEEE 1394 data packets.
Figure 8B:
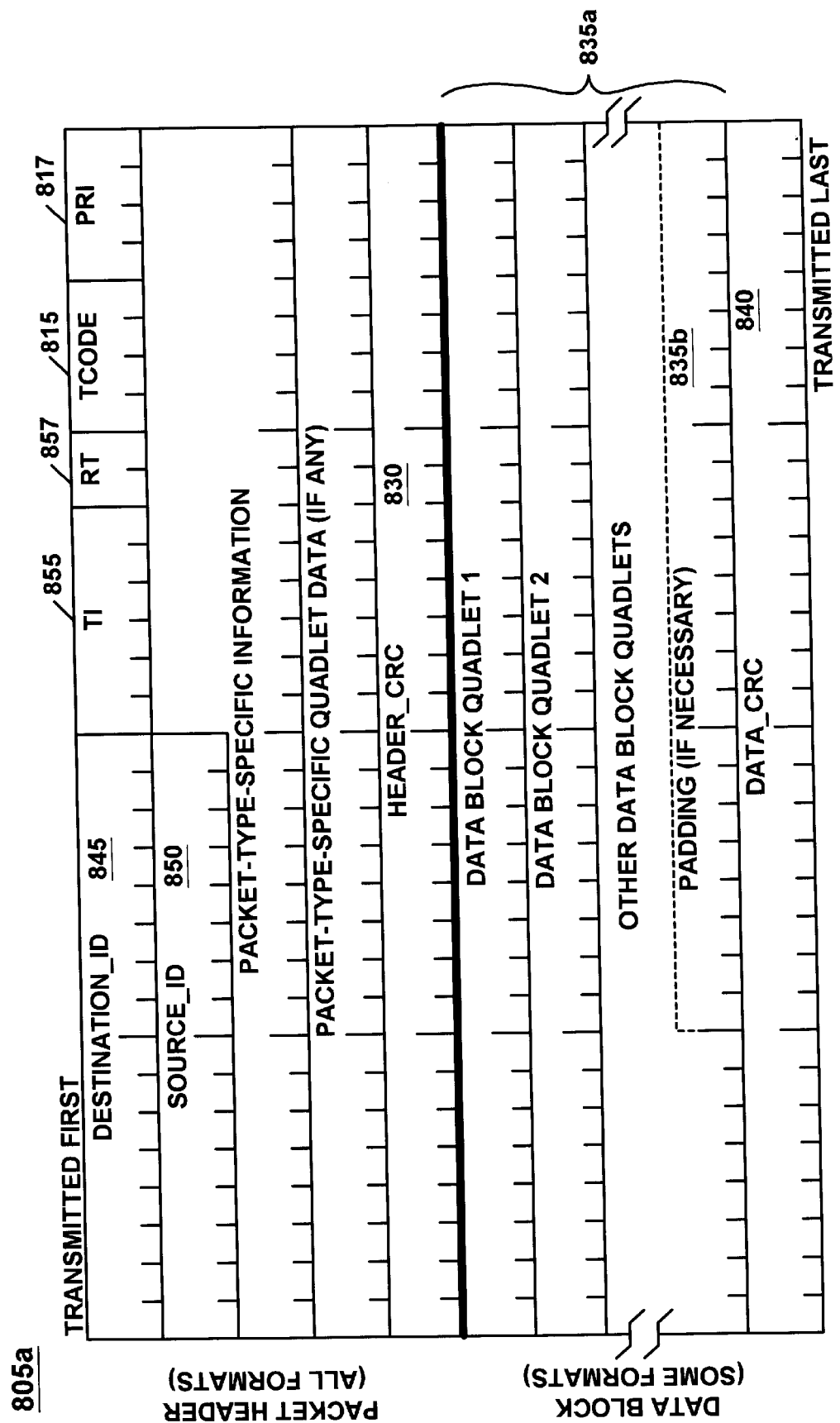

At step 730 of FIG. 7, the present invention constructs a new header section 352 within the data packet format of the first communication domain, e.g., the IEEE 1394 domain. FIG. 8A and FIG. 8B illustrate exemplary frame formats 805 (generic) and 805a (asynchronous) used by the IEEE 1394 domain. The new header section 352, in accordance with frame format 805, comprises: a header quadlet 810; a second header quadlet 820; a tcode field 815 and a header_CRC field 830. The new header section 352, in accordance with frame format 805a, comprises: a destination_ID 845; a tl (translation label) code 855; an rt (retry code) code 857; a tcode (transaction code) 815; a pri (priority) code 817; and a source_ID 850. A header_CRC field 830 is also included. These fields are determined and inserted at step 730 and are described with respect to the table of FIG. 8C. The tl code 855, the rt code 857, the tcode 815, the pri code 817 and the header_CRC can be generated within the present invention using well known mechanisms.

The destination_ID used for field 845 is the destination node_ID obtained by step 720 and optionally translated by step 725. The source_ID at field 850 refers to the address of the bridge circuit 220 as defined by the first communication domain. In this embodiment, the source address field 850 is the IEEE 1394 node ID of the bridge circuit 220.

At step 735 of FIG. 7, the present invention then calculates any pad section that may be required within the data payload section 364. The padding section 835b (FIG. 8A and FIG. 8B) indicates extra bits added so that overall frame 805 or 805a meets certain minimum and maximum sizing and byte alignment requirements which are well known within the IEEE 1394 serial communication standard. This computed pad section 835b is then appended to the data payload section 364 at step 735.

At step 740 of FIG. 7, the present invention assembles a new data packet for the first communication domain including the new header 352, as described above, and the appended pointer 354 which references the data payload 364. The original header section 362 and trailer section 366 of the received Ethernet data packet are stripped away and discarded. At step 745, the present invention forwards the new header 352 to the interface control circuitry 420 for transmission to the first communication bus 240. The second pointer 354 is then passed to the interface control circuitry 420 which automatically accesses the data within the data payload section 364 and broadcasts this data over the first communication bus 240 until termination, e.g., an end delimiter is discovered at step 750, the payload data is fully transmitted as discovered by its previously determined length, or a bus idle is detected. Step 745 is re-entered until termination and each byte of data payload section 364 is directly accessed from memory 312 and broadcast over bus 240. Upon termination, step 755 is entered which broadcasts any padding as required. Process 700 then terminates.

Using well known methods, the interface control circuitry 420 generates a new trailer for the new 1394 data packet automatically (at step 755) and performs the required cyclic redundancy checks (CRC) and inserts this data as the trailer (e.g., data_CRC) section 840 (FIG. 8A, FIG. 8B). It is appreciated that process 700 is advantageous over the prior art because the data payload section 364 is not recopied to any memory space at any step during the assembly of the new IEEE 1394 packet or during its transmission over the first communication domain.

It is appreciated that process 500 can occur simultaneous with process 700 within the simultaneous bi-directional bridge circuit 220 of the present invention.

The preferred embodiment of the present invention, a method for efficient data transfers between domains of differing data formats, is described. While the present invention has been described in particular embodiments, it should be appreciated that the present invention should not be construed as limited by such embodiments, but rather construed according to the below claims.

What is claimed is:

1. In a bridge circuit, a method for transferring information comprising the computer implemented steps of:
    a) storing a first data packet, received from a communication bus of a first communication domain, into a first memory space of a memory unit, wherein said data packet is of a first packet format and comprises: a header section; a data payload section; and a trailer section;
    b) recording a pointer indicating the start of said data payload section in said first memory space;
    c) generating a new header section of a second packet format, different from said first packet format, and corresponding to a second communication domain;
    d) appending said pointer to said new header section; and
    e) transmitting said new header section over said second communication domain and, using said pointer as a reference, transmitting said data payload section directly from said first memory space and over said second communication domain.

2. A method as described in claim 1 wherein said pointer includes a length of said data payload section and wherein further said step c) comprises the steps of:
    accessing said data payload section to obtain a destination address of a node within said second communication domain and storing said destination address as a part of said new header section; and
    storing an address of said bridge circuit as a source address of said new header section.

3. A method as described in claim 2 wherein said step e) comprises the steps of:
    e1) transmitting said new header section and said data payload section, as a new data packet, to an interface controller circuit of said second communication domain, said new data packet for a destination node indicated by said destination address;
    e2) computing a cyclic redundancy check (CRC) of said new header section and said data payload section; and
    e3) transmitting a trailer section including said CRC over said second communication domain for said destination node, said steps e2) and e3) performed by said interface controller circuit.

4. A method as described in claim 1 further comprising the steps of:
    f) storing a second data packet, received from a communication bus of said second communication domain, into a second memory space wherein said second data packet is of said second packet format and comprises: a header section; a data payload section; and a trailer section;
    g) calculating a pointer indicating the start of said data payload section in said second memory space;
    h) generating a new header section of said first packet format and corresponding to said first communication domain;
    i) appending said pointer of step g) to said new header section of step h); and
    j) transmitting said new header section of step h) over said first communication domain and, using said pointer of step g) as a reference, transmitting said data payload section directly from said second memory space and over said first communication domain.

5. A method as described in claim 1 wherein said first communication domain is compatible with the IEEE 1394 communication standard.

6. A method as described in claim 1 wherein said first communication domain is compatible with the Ethernet IEEE 802.3 communication standard.

7. A method as described in claim 1 wherein said header section of said first data packet comprises: a destination address that is an address of said bridge circuit; and a source address indicating a node of said first communication domain originating from said first data packet.

8. A method as described in claim 1 wherein said step c) includes the steps of recylcing and reusing said header section in a multi-packet session.

9. A bridge circuit coupled between first and second communication domains and comprising: first and second interface controllers coupled to a processor coupled to a memory wherein said memory contains instructions that when executed implement a method for transferring information, said method comprising the steps of:
    a) storing a first data packet, received from a communication bus of said first communication domain, into a first memory space of a memory unit, wherein said data packet is of a first packet format and comprises: a header section; a data payload section; and a trailer section;
    b) calculating a pointer indicating the start and length of said data payload section in said first memory space;
    c) generating a new header section of a second packet format, different from said first packet format, and corresponding to a second communication domain;
    d) appending said pointer to said new header section; and
    e) transmitting said new header section over said second communication domain and, using said pointer as a reference, transmitting said data payload section directly from said first memory space and over said second communication domain.

10. A bridge circuit as described in claim 9 wherein said step c) of said method comprises the steps of:
    accessing said data payload section to obtain a destination address of a node within said second communication domain and storing said destination address as a part of said new header section; and
    storing an address of said bridge circuit as a source address of said new header section.

11. A bridge circuit as described in claim 10 wherein said step e) of said method comprises the steps of:
    e1) transmitting said new header section and said data payload section, as a new data packet, to an interface controller circuit of said second communication domain, said new data packet for a destination node indicated by said destination address;

e2) computing a cyclic redundancy check (CRC) of said new header section and said data payload section; and e3) transmitting a trailer section including said CRC over said second communication domain for said destination node, said steps e2) and e3) performed by said interface controller circuit.

12. A bridge circuit as described in claim 9 wherein said method further comprises the steps of:

f) storing a second data packet, received from a communication bus of said second communication domain, into a second memory space wherein said second data packet is of said second packet format and comprises: a header section; a data payload section; and a trailer section;

g) calculating a pointer indicating the start of said data payload section in said second memory space;

h) generating a new header section of said first packet format and corresponding to said first communication domain;

i) appending said pointer of step g) to said new header section of step h); and j) transmitting said new header section of step h) over said first communication domain and, using said pointer of step g) as a reference, transmitting said data payload section directly from said second memory space and over said first communication domain.

13. A bridge circuit as described in claim 9 wherein said first communication domain is compatible with the IEEE 1394 communication standard.

14. A bridge circuit as described in claim 9 wherein said first communication domain is compatible with the Ethernet IEEE 802.3 communication standard.

15. A bridge circuit as described in claim 9 wherein said header section of said first data packet comprises: a destination address that is an address of said bridge circuit; and a source address indicating a node of said first communication domain originating from said first data packet.

16. In a bridge circuit, a method for transferring information comprising the computer implemented steps of:

a) storing a first data packet, received from a communication bus of an IEEE 1394 communication domain, into a first memory space of a memory unit, said data packet of a first packet format and comprising: a header section; a data payload section; and a trailer section;

b) calculating a pointer indicating the start and length of said data payload section in said first memory space;

c) generating a new header section of a second packet format, different from said first packet format, and corresponding to an Ethernet communication domain;

d) appending said pointer to said new header section; and e) transmitting said new header section over said Ethernet communication domain and, using said pointer as a reference, transmitting said data payload section directly from said first memory space and over said Ethernet communication domain.

17. A method as described in claim 16 wherein said step c) comprises the steps of:

accessing said data payload section to obtain a destination address of a node within said Ethernet communication domain and storing said destination address as a part of said new header section; and storing an address of said bridge circuit as a source address of said new header section.

18. A method as described in claim 17 wherein said step e) comprises the steps of:

e1) transmitting said new header section and said data payload section, as a new data packet, to an interface controller circuit of said Ethernet communication domain, said new data packet for a destination node indicated by said destination address;

e2) computing a cyclic redundancy check (CRC) of said new header section and said data payload section; and e3) transmitting a trailer section including said CRC over said Ethernet communication domain for said destination node, said steps e2) and e3) performed by said interface controller circuit.

19. A method as described in claim 16 further comprising the steps of:

f) storing a second data packet received from a communication bus of said Ethernet communication domain by storing a header section, a data payload section and a trailer section of said second data packet into a second memory space, wherein said second data packet is of said second packet format;

g) calculating a pointer indicating the start of said data payload section in said second memory space;

h) generating a new header section of said first packet format and corresponding to said IEEE 1394 communication domain;

i) appending said pointer of step g) to said new header section of step h); and j) transmitting said new header section of step h) over said IEEE 1394 communication domain and, using said pointer of step g) as a reference, transmitting said data payload section directly from said second memory space and over said IEEE 1394 communication domain.

20. A method as described in claim 16 wherein said header section of said first data packet comprises: a destination address that is an address of said bridge circuit; and a source address indicating a node of said IEEE 1394 communication domain originating from said first data packet.

* * * * *